United States Patent
Schultes

(10) Patent No.: US 6,173,905 B1
(45) Date of Patent: Jan. 16, 2001

(54) DISPERSION DEVICE FOR A DISPENSER FOR SPRINKLING LIQUID ONTO SUBSTANCE AND/OR HEAT EXCHANGE SYSTEMS

(75) Inventor: Michael Schultes, Ludwigshafen/Rhein (DE)

(73) Assignee: Raschig GmbH (DE)

(*) Notice: Under 35 U.S.C. 154(b), the term of this patent shall be extended for 0 days.

(21) Appl. No.: 09/355,870
(22) PCT Filed: Jan. 24, 1998
(86) PCT No.: PCT/EP98/00400
§ 371 Date: Aug. 3, 1999
§ 102(e) Date: Aug. 3, 1999
(87) PCT Pub. No.: WO98/33570
PCT Pub. Date: Aug. 6, 1998

(30) Foreign Application Priority Data

Feb. 3, 1997 (DE) .......................................... 297 01 830.2

(51) Int. Cl.⁷ ..................................................... B05B 1/36
(52) U.S. Cl. .............................................. 239/194; 261/97
(58) Field of Search ..................................... 239/548, 550, 239/552, 558, 542, 193, 194; 261/97, DIG. 44

(56) References Cited

U.S. PATENT DOCUMENTS

| | | | |
|---|---|---|---|
| 3,006,623 | * 10/1961 | Ross et al. .............................. | 261/97 |
| 4,267,978 | * 5/1981 | Manteufel ............................. | 239/193 |
| 4,444,696 | * 4/1984 | Harper et al. .......................... | 261/97 |
| 4,476,069 | * 10/1984 | Harper et al. .......................... | 261/97 |
| 4,557,877 | * 12/1985 | Hofstetter ............................... | 261/97 |
| 4,776,989 | * 10/1988 | Haper et al. ........................... | 261/97 |
| 4,803,350 | * 2/1989 | Robbins et al. ........................ | 261/97 |
| 5,269,465 | * 12/1993 | Zich et al. ............................. | 239/193 |

\* cited by examiner

Primary Examiner—Lesley D. Morris
Assistant Examiner—Dinh Q. Nguyen
(74) Attorney, Agent, or Firm—Orum & Roth

(57) ABSTRACT

A dispersion device for spreading liquid over heat transfer surfaces. A tube shaped central element has guide elements in its interior which extend out of the central element's bottom end pointing away from the longitudinal axis of the central element channeling and dividing liquid flow into a pattern of liquid trickles.

16 Claims, 4 Drawing Sheets

Figure 1:
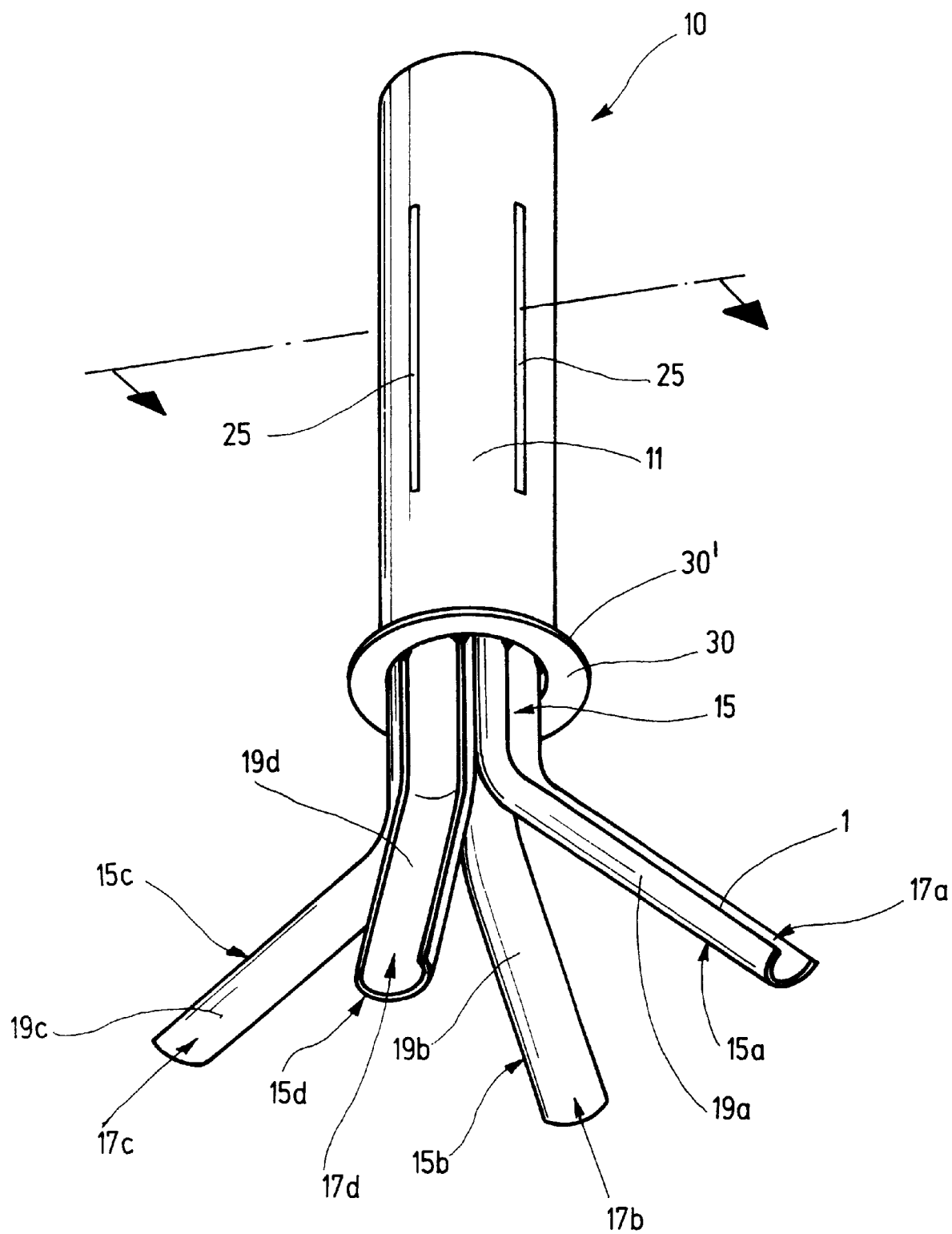

DISPERSION DEVICE FOR A DISPENSER FOR SPRINKLING LIQUID ONTO SUBSTANCE AND/OR HEAT EXCHANGE SYSTEMS

DESCRIPTION

The invention relates to a dispersion device for a liquid distributor for a trickling of mass and/or heat transfer systems, in particular packing elements for structured or random packing arranged in columns or towers, which has a central element which can be inserted in an outlet opening of the liquid distributor and has, in its section protruding in its inserted state into the interior space of the liquid distributor, several inlet openings through which the liquid being contained in the liquid distributor can enter the interior of the central element.

Such a dispersion device for a liquid distributor is known. In this case, it is provided that the central element of the dispersion device is designed as outlet tube which is welded in the pertinent outlet opening of the liquid distributor. Each outlet tube has borings, which are positioned a few centimeters above the bottom of the liquid distributor, through which the liquid can flow from the interior of the liquid distributor into the outlet tube due to the effect of the gravitation. Each outlet tube of the liquid distributor opens in a pot arranged outside the liquid distributor. At the bottom edge of the pot wall, fingers are connected with or integrally attached to the pot wall, which are curved outwards. In the pot wall, above the fingers, openings are provided through which the liquid, having flown out from the liquid distributor and being held in the pot, can emerge and flow to the fingers in order to supply the to-be-fractioned liquid to the packing elements for random or structured packing contained in the mass and/or heat transfer column.

The known dispersion device for a liquid distributor as well as a liquid distributor using this dispersion device have the disadvantage that the design of the dispersion device described above and thus of the liquid distributor is extremely expensive and therefore uneconomical.

It is therefore the object of the invention to further develop a dispersion device of the type mentioned at the beginning so that a simple and cost efficient design is provided.

According to the invention, this problem is solved in that the central element is of a tube-shaped design, that in the interior space of the tube-shaped central element of the dispersion device one or several discharge elements are arranged, each having an upper channel section and a lower trickle section, the upper channel sections of the discharge elements divide the interior space of the tube-shaped central element of the dispersion device into a corresponding number of discharge channels into which the liquid can enter through the inlet openings arranged in the wall of the central element, and the lower trickle sections of the discharge elements, protruding from the central element, form finger elements which point away from an longitudinal axis of the central element and from which the liquid which is contained in the liquid distributor and entering the discharge channels of the central element through the inlet openings of the central element of the dispersion device, can trickle on the mass and/or heat transfer system.

By means of the measures according to the invention, a dispersion device, particularly suited for a trough distributor, is provided in an advantageous way for the trickling of mass and/or heat transfer systems, in particular columns and towers, which is distinguished by its simple and hence cost efficient design: To draw off the liquid from the liquid distributor as well as to distribute the liquid onto the packing elements of the mass and/or heat transfer columns, is no longer necessary—as in the case of the known liquid distributors using known dispersion devices—to employ a dispersion device consisting of two separate components, namely of a discharge tube and a pot separated physically from it and being arranged outside the liquid distributor, for the installation of which in the liquid distributor the discharge tube has first to be inserted tightly in the outlet opening of the known liquid distributor, then the pot with the thereon formed discharge fingers has to be pushed over the lower part of the tube protruding from the liquid distributor and afterwards the pot has to be welded to the bottom of the liquid distributor.

On the contrary, the dispersion device designed according to the invention is in an advantageous way cost efficient to produce due to its relatively simple design and furthermore can be installed in the liquid distributor in a single operation. The discharge elements which are arranged inside the tube-shaped central element and which form the discharge channels and, at the same time, the discharge fingers represent relatively simple and therefore cost efficient to produce components which can be preassembled into a discharge element unit and therefore can be inserted easily in the tube-shaped central element of the dispersion device for a liquid distributor and installed there. The dispersion device designed in such an inventive way, therefore can be inserted particularly easy in the outlet opening of the liquid distributor.

An advantageous further development of the invention provides that the central element has an outwards protruding stop element which, when the dispersion device is inserted in the liquid distributor, forms a stop face. This measure brings about that an easy sealing of the outlet opening, accommodating the inventive dispersion device, is ensured since the stop element, preferably a flange, having a larger diameter as the central element, easily can be connected mechanically with the liquid distributor. Furthermore, the stop element of the central element brings forth that, in an advantageous way, its exact positioning in the inlet openings of the central element is achieved.

Other advantageous further developments of the invention are the subject-matter of the dependent claims.

Other particulars and advantages of the invention can be inferred from the exemplary embodiment which is described in the following by means of the figures. Here, FIG. 1 shows an exemplary embodiment of a dispersion device, FIG. 2 shows a section along the line 11—II of FIG. 1, FIG. 3 shows a schematic representation of a known liquid distributor, and FIG. 4 shows an embodiment of a liquid distributor with the inserted dispersion device.

Figure 2:
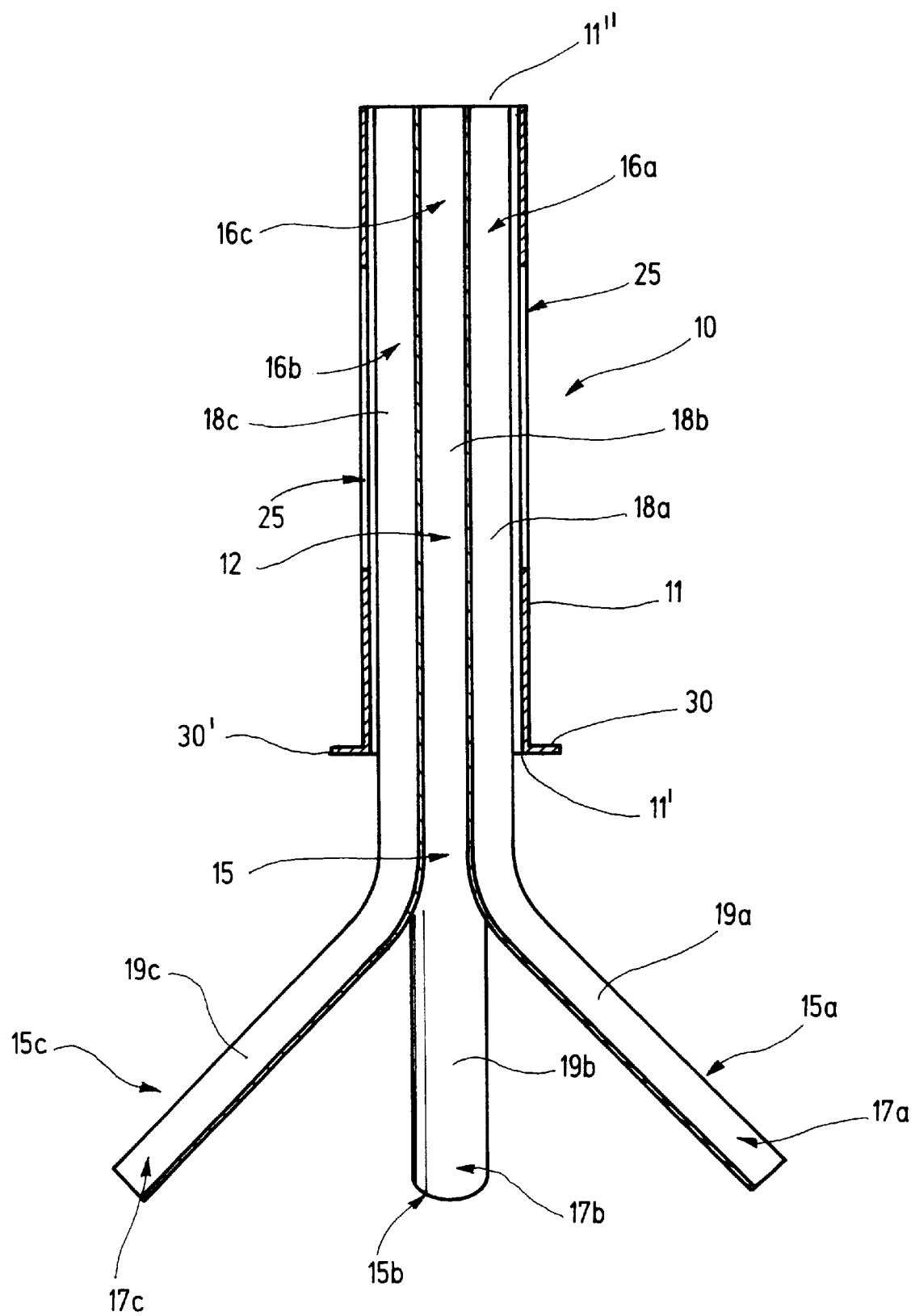
Figure 3:
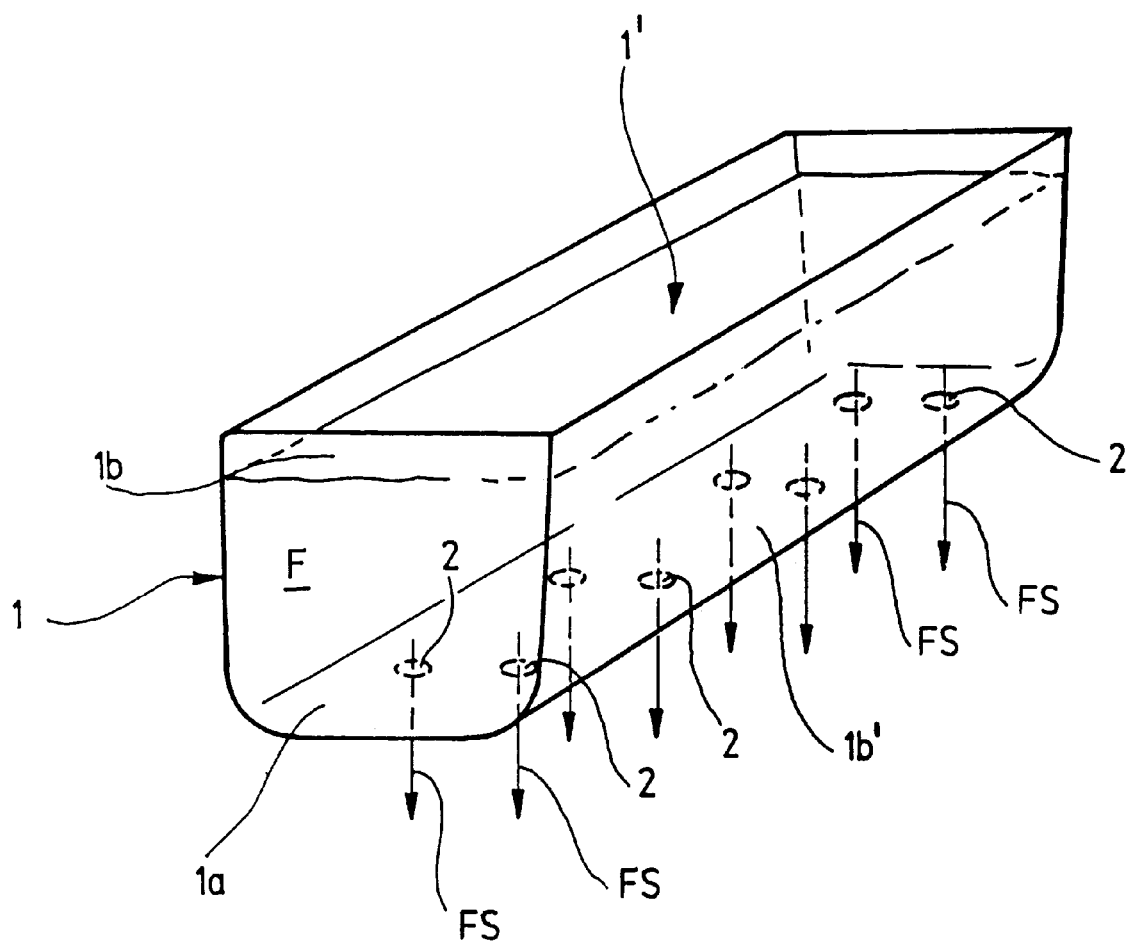
Figure 4:
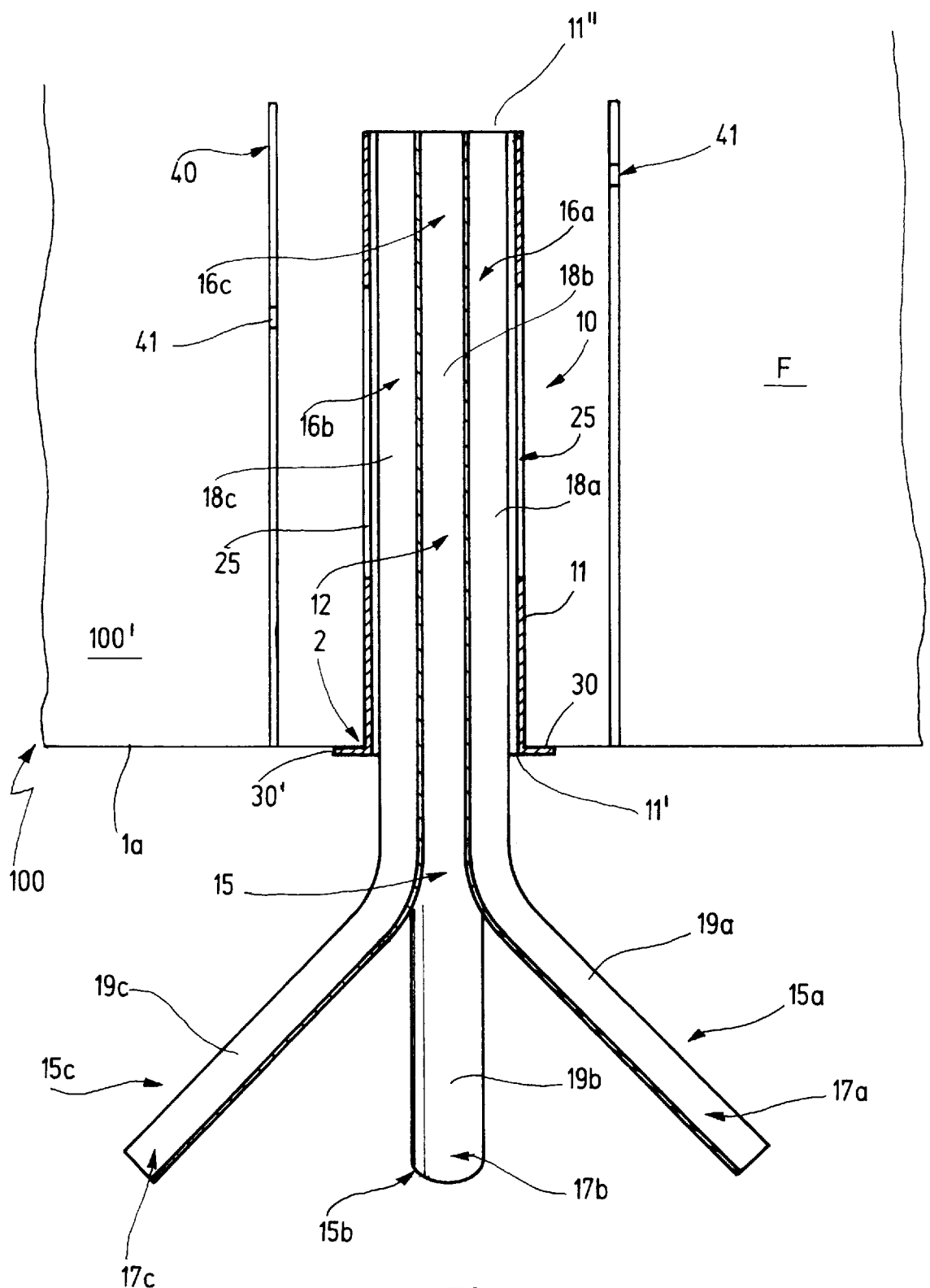

Now, before the preferred embodiment of a dispersion device represented in FIGS. 1 and 2, generally designated by 10, for a liquid distributor 1 is described in detail, the fundamental design and the mode of operation of the liquid distributor 1 shown in FIG. 3 first will be elucidated briefly for the sake of completeness. The shown embodiment of a liquid distributor 1 for the trickling of mass and/or heat transfer systems, in particular packing elements for structured or random packing arranged in towers or columns, is designed as an upwards open trough distributor which has a bottom section 1*a* and two wall sections 1*b*, 1*b*'. In the bottom section 1, outlet openings 2 are provided through which the liquid F, fed to the liquid distributor 1 and present in its interior space 1', can emerge in streams of liquid FS due to the effect of the gravitation, thus without pressure, via the dispersion devices 10, insertable in the outlet openings 2, to trickle onto packing elements (not shown) of a mass and/or heat transfer column—or of a tower of that kind—arranged below the liquid distributor 1. The design of such a liquid distributor 1 is known to the artisan—among others also from the applicant's information booklet "Internals For Packed Columns"—so that he is also aware of that the arrangements and designs of the liquid distributor 1 shown in FIG. 3, and in particular of its outlet openings 2, are only of an exemplary character and on no account are to be understood as limiting. He is in particular aware of that in the case of a real liquid distributor 1, the number of outlet openings 2 is greater by far than the one shown in FIG. 3 since for reasons of clarity only a few outlet openings 2 are shown in this figure. This, however, does not limit the generality of the following considerations.

Now as is evident from FIGS. 1 and 2, the described dispersion device 10 for the liquid distributor 1 comprises a central element 11 and four discharge elements 15a–15d as well as a stop element, in particular a flange, protruding radially outwards from the central element 11. The central element 11 is of a tube-shaped design and preferably made of metal, for example, of stainless steel or aluminium, or of a plastics material. In the interior space 12 of the tube-shaped central element 11, which is circumvened by a wall, the four discharge elements 15a–15d are arranged which in the case shown here extend, starting approximately from the upper end 11" of the central element 11, downwards, protrude from the lower end 11' of the central element 11 and have there preferably an outward curved shape. In the interior space 12 of the tube-shaped central element 11, upper channel sections 18a–18d of the discharge elements 15a–15d form discharge channels 16a–16d which, via a corresponding number of inlet openings 25 of the tube-shaped central element 11, are connected with the interior space 1' of the liquid distributor 1. By this means the liquid F in the interior of the liquid distributor 1 can enter in split streams FS, without any pressure load, the discharge channels 16a–16d limited by the upper channel sections 18a–18d of the discharge elements 15a–15d. From there they arrive at the trickle sections 19a–19d of the discharge elements 15a–15d formed integrally with the channel sections 18a–18d of the discharge elements 15a–15d. These form finger elements 17a–17d which point away from a longitudinal axis of the central element 11 and from which the liquid F, entering from the interior space 1' of the liquid distributor 1 through the inlet opening 25 and the interior space 12 of the tube-shaped central element 11—and thus in the discharge channels 16a–16d arranged therein—can trickle onto the packing elements of the mass and/or heat transfer systems arranged under the dispersion device 10 of the liquid distributor 1.

The single-piece character of the channel sections 18a–18d, limiting the discharge channels 16a–16d, with the trickle sections 19a–19d forming finger elements 17a–17d, obtained by the described discharge elements 15a–15d does not only achieve in an advantageous way that the manufacture of the individual discharge elements 15a–15d is particularly simple and therefore cost efficient. Rather, the installation of the discharge elements 15a–15d—which preferably consist of simple half-tubes—in the central element 11 can be carried out particularly easy since, for the construction of the described dispersion device 10, the four discharge elements 15a–15d first can be fitted together into a single unit 15. Such a pre-assembled discharge element unit 15 is then placed in the interior space 12 of the central element 11 of the dispersion device 10 and connected with the latter.

Finally, in respect of the design of the central element 11 of the dispersion device 10 as well as the discharge elements 15a–15d, it should be mentioned that it is not necessary that the central element 11 has the hollow cylindrical design shown in FIGS. 1 and 2. Rather, it is also possible that the wall 11a of the tube-shaped central element 11 has a polygonal or oval cross-section.

In a corresponding manner, it is not necessary that the preferably through-shaped discharge elements 15a–15d have the shown semi-circular cross-section. It is clearly evident to the artisan from the description above that he also can select a V- or U-shaped cross-section of the discharge elements 15a–15d. Any polygonal cross-section is also possible.

It is likewise obvious to him that the shown number of four discharge elements 15a–15d only is of an exemplary character since it is just as well possible to insert more or fewer discharge elements 15a–15d in the interior space 12 of the central element 11 of the dispersion device 10.

It is likewise an advantage that the central element 11 has—preferably at its lower end 11'—a stop element, here the outwards protruding flange 30. In this way, it is easily possible in the inserted state of the dispersion device 10 to seal the outlet opening 2 associated with it by welding or sealing the peripheral edge 30' of the flange 30 to the bottom 1a of the liquid distributor 1. The diameter of the flange 30, which is larger than the diameter of the central element 11 of the dispersion device 10, results in an advantageous way that the welding operation is easier to carry out. In this connection, it should be mentioned that for a plurality of application purposes it can be completely sufficient that the flange 30 is only spot welded to the bottom 1a of the liquid distributor 1 and that the remaining peripheral area is sealed liquid-tight by means of an appropriate sealing means.

Another advantage of the flange 30, manufactured integrally with central element 11 or connected firmly with the latter, consists in that in this way an exact positioning the inlet openings 25 of the dispersion device 10 is provided in the liquid distributor 1.

In conclusion, it should be noted that the described dispersion device 10 has not only the advantages of its simple design and its easiness in installing.

Rather, other advantages of the described dispersion device 10 consist in that the latter is of extremely compact construction and is easy to clean.

In FIG. 4, a partial longitudinal section through a liquid distributor 100 with an inserted dispersion device 10 is shown in which case the liquid distributor 100 corresponds in its basic design to the liquid distributor 1 of FIG. 3. Now, the essential difference between the liquid distributor 1 and the liquid distributor 100 as shown in FIG. 4 consists in that the liquid distributor 100 has an encasing element 40, preferably an encasing tube, for the central element 11 of the dispersion device 10 projecting in its inner section 100'. This encasing element 40 is equipped with at least one inlet opening 41 so that the liquid F in the interior space 100' of the liquid distributor 100 can reach, via the inlet opening 41 of the encasing element 40, the dispersion device 10 accommodated in it.

The arrangement of an encasing element 40 around the central element 11 of the dispersion device 10 has the advantage that in spite of relatively large inlet openings 25 of the discharge channels 16–16d of the dispersion device 10, a relatively small throughput of liquid can be achieved for each of the four discharge channels 16–16d since the incoming flow of liquid F to be distributed by the dispersion device 10 is limited by the at least one inlet opening 41 of the encasing element 40. In practical use it is generally not possible to design the inlet openings 25 of the central element 11 of the dispersion device 10 with a diameter of less than 2 mm since otherwise there is a risk that the inlet openings 25 clog up, so that due to the minimum size of the inlet openings 25, a minimum value of the volume flow, proportional to the diameter of the inlet opening 25, is obtained.

The arrangement of the encasing element 40 around the central element 11 of the dispersion device 10 has furthermore the advantage that no liquid gradient occurs in the interior of the encasing element 40 so that in an advantageous way a nonuniform distribution of the streams of liquid FS, emerging through the individual discharge channels 16–16d, is effectively counteracted and low heads can be allowed.

What is claimed is:

1. A dispersion device insertable into an outlet opening of a liquid distributor for the trickling of mass and/or heat transfer systems, said device comprising:
   a central element defined by a tube-shaped wall having an upper end, a lower end, and an interior space therebetween, said upper end including at least one inlet opening extending through said wall, said at least one opening for communicating a liquid present in the liquid distributor into the interior space of the central element without pressure; and
   at least one discharge element arranged within the interior space of said central element, each discharge element having an upper channel section and a lower trickle section, the upper channel section dividing the interior space of the central element into a corresponding number of discharge channels, into which the liquid from the distributor enters through the at least one inlet opening, the lower trickle section of the discharge element protruding from the central element so as to form finger-shaped elements which point away from a longitudinal axis of the central element and which conduct and trickle the liquid onto the mass and/or heat transfer system.

2. The dispersion device according to claim 1, wherein at least one of the discharge elements is of a through-shaped design.

3. The dispersion device according to claim 2, wherein the at least one discharge element has a cross-section which is one of a semi-circular, polygonal, U, and V-shaped.

4. The dispersion device according to claim 1, wherein the trickle section of at least one discharge element comprises an outwardly curved shaped.

5. The dispersion device according to claim 1, wherein at least one inlet opening is associated with each discharge channel.

6. The dispersion device according to claim 5, wherein at least one of the inlet openings is circularly shaped.

7. The dispersion device according to claim 5, wherein at least one of the inlet openings is a vertically disposed slit.

8. The dispersion device according to claim 1, wherein the central element includes a radially outwards protruding stop element.

9. The dispersion device according to claim 8, where said stop element is formed as a flange.

10. The dispersion device according to claim 9, wherein the flange is formed integrally with the central element.

11. The dispersion device according to claim 8, where said flange is firmly connected with said central element.

12. The dispersion device according to claim 1, wherein the wall of the central element has one of a circular, oval or polygonal cross-section.

13. A liquid distributor having a bottom section with at least one outlet opening, in which a dispersion device is insertable, said device comprising:
   a central element defined by a tube-shaped wall having an upper end, a lower end, and an interior space therebetween, said upper end including at least one inlet opening extending through said wall, said at least one opening for communicating a liquid present in the liquid distributor into the interior space of the central element without pressure; and
   at least one discharge element arranged within the interior space of said central element, each discharge element having an upper channel section and a lower trickle section, the upper channel section dividing the interior space of the central element into a corresponding number of discharge channels into which the liquid from the distributor enters through the at least one inlet opening the lower trickle section of the discharge element protruding from the central element so as to form finger-shaped elements which point away from a longitudinal axis of the central element and which conduct and trickle the liquid onto the mass and/or heat transfer system.

14. The liquid distributor according to claim 13 characterized in that]for the trickling of mass and/or heat transfer systems, said distributor having at least one outlet opening, having associated therewith a respective encasing element, which surrounds a central element of the dispersion device inserted into that outlet opening.

15. The liquid distributor according to claim 14, wherein the encasing element includes at least one inlet opening therein.

16. The liquid distributor according to claim 15, wherein the encasing element is connected to a bottom section of the liquid distributor.

* * * * *